US011372570B1

(12) United States Patent
Kamo et al.

(10) Patent No.: US 11,372,570 B1

(45) Date of Patent: Jun. 28, 2022

(54) STORAGE DEVICE, COMPUTER SYSTEM, AND DATA TRANSFER PROGRAM FOR DEDUPLICATION

(71) Applicant: Hitachi, Ltd., Tokyo (JP)

(72) Inventors: Yuto Kamo, Tokyo (JP); Mitsuo Hayasaka, Tokyo (JP); Shimpei Nomura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/468,654

(22) Filed: Sep. 7, 2021

(30) Foreign Application Priority Data

Feb. 12, 2021 (JP) ............................ JP2021-021300

(51) Int. Cl.
*G06F 3/06* (2006.01)

(52) U.S. Cl.
CPC .......... *G06F 3/0641* (2013.01); *G06F 3/0604* (2013.01); *G06F 3/067* (2013.01); *G06F 3/0647* (2013.01); *G06F 3/0659* (2013.01)

(58) Field of Classification Search
CPC .... G06F 3/0641; G06F 3/0604; G06F 3/0647; G06F 3/0659; G06F 3/067
See application file for complete search history.

(56) References Cited

U.S. PATENT DOCUMENTS

| | | | | |
|---|---|---|---|---|
| 6,928,526 | B1 | 8/2005 | Zhu et al. | |
| 9,141,301 | B1 * | 9/2015 | Wallace | G06F 16/162 |
| 2016/0150012 | A1 * | 5/2016 | Barszczak | G06F 3/067 709/219 |
| 2017/0206022 | A1 * | 7/2017 | Theinert | G06F 3/0685 |
| 2019/0286358 | A1 * | 9/2019 | Stronge | G06F 3/0644 |
| 2020/0014756 | A1 * | 1/2020 | Boss | H04L 67/1095 |
| 2020/0057669 | A1 * | 2/2020 | Hutcheson | G06F 3/0619 |
| 2020/0151189 | A1 * | 5/2020 | Kramer | G06F 16/9535 |
| 2021/0318934 | A1 * | 10/2021 | Heckel | G06F 3/0619 |

* cited by examiner

*Primary Examiner* — Charles Rones
*Assistant Examiner* — Tong B. Vo
(74) *Attorney, Agent, or Firm* — Volpe Koenig

(57) ABSTRACT

Provided is an edge storage having a central processing unit (CPU). The edge storage is connected to another storage device capable of deduplicating and managing a data of a file in units of a predetermined chunk via a network, in which, when a data of a newly created file or an updated file is transferred to the other storage device, the CPU determines whether to transmit a difference portion to a core storage or to transmit a finger print of a difference chunk to the core storage, based on a size of the difference portion and a size of the finger print of the difference chunk which is a chunk including the difference portion and transmits the difference portion or the finger print to the core storage according to a determination result.

8 Claims, 12 Drawing Sheets

FIG. 3

FILE VIRTUALIZATION MANAGEMENT INFORMATION T10

USER FILE MANAGEMENT INFORMATION T11

C11 C12 C13

| ACCESS PATH | FILE STATE | FILE ID |
| --- | --- | --- |
| Abc012 | Dirty | BB |

PARTIAL MANAGEMENT INFORMATION T12

C16 C17 C18

| Offset | Length | PARTIAL STATE |
| --- | --- | --- |
| 0 | 128 | Dirty |
| 128 | 512 | Stub |
| 640 | 256 | Cached |
| 896 | 256 | Dirty |

FIG. 4

DUPLICATION STATE MANAGEMENT TABLE T20

| FILE ID C21 | IN-FILE OFFSET C22 | CHUNK LENGTH C23 | DATA REDUCTION PROCESSED FLAG C24 | CHUNK STATE C25 | DUPLICATION CHUNK STORAGE FILE ID C26 | REFERENCE OFFSET C27 |
|---|---|---|---|---|---|---|
| XX | 0 | 5120 | False | NON -DUPLICATION | - | - |
| | 5120 | 4096 | True | DUPLICATION | AA | 0 |
| | 9216 | 6144 | False | DUPLICATION | AA | 4096 |

FIG. 5

DUPLICATION CHUNK MANAGEMENT TABLE T30

| FILE ID C31 | OFFSET C32 | CHUNK LENGTH C33 | REFERENCE NUMBER C34 |
|---|---|---|---|
| AA | 0 | 7168 | 2 |
| | ⋮ | | |

FIG. 6

DUPLICATION DETERMINATION TABLE T40

| FINGER PRINT C41 | FILE ID C42 | OFFSET C43 | CHUNK LENGTH C44 |
|---|---|---|---|
| XXXXXXXX | XX | 0 | 5120 |
| AAAAAAAA | AA | 0 | 7168 |
| YYYYYYYY | XX | 12288 | 8192 |
| ⋮ | | | |

FIG. 7

TRANSFER DUPLICATION CHUNK LIST T50

| IN-FILE OFFSET C51 | CHUNK LENGTH C52 | DUPLICATION CHUNK STORAGE FILE ID C53 | REFERENCE OFFSET C54 |
|---|---|---|---|
| 0 | 6144 | - | - |
| 6144 | 4096 | YY | 0 |
| 20480 | 6144 | YY | 4096 |

STORAGE DEVICE, COMPUTER SYSTEM, AND DATA TRANSFER PROGRAM FOR DEDUPLICATION

BACKGROUND OF THE INVENTION

1. Field of the Invention

The present invention relates to a technique for transferring a data between a plurality of storage devices.

2. Description of Related Art

There are increasing demands for a platform that links between bases such as a hybrid cloud and an edge-core collaboration. A file virtualization function is a technique that meets these demands. The file virtualization function includes a function that detects a data of a file generated/updated in an edge storage in units of bytes and asynchronously migrates the data to a core storage, a stubification function that deletes a file that is not accessed by a client from the storage, and a recall function that acquires a target data in units of bytes from the core storage when the data is referenced again by the client.

A largest bottleneck in the file virtualization function is network transfer between bases (for example, wide area network (WAN) transfer), and a technique for reducing a network communication amount is required.

U.S. Pat. No. 6,928,526 discloses a technique (called network deduplication) of reducing chunk transfer when there exist chunks having the same finger print (FP) in a core, by calculating the FP of chunks in an edge, transferring the FP to the core, and performing the duplication determination in the core.

For example, in some cases, the technique disclosed in U.S. Pat. No. 6,928,526 may not always be effective in reducing the communication amount in the network between the core and the edge. For example, in the technique according to U.S. Pat. No. 6,928,526, the FP of the chunk that is a transfer target in which the update has occurred is calculated. When the data of the chunk is required for calculation of the FP and most of the chunk is a stubified area (stub area), it is necessary to recall the data of the stub area, and thus, there is a concern that the communication amount of the network may increase. In addition, when the update area in the chunk is small, there is a concern that the communication amount of the network may increase by communicating with the FP.

SUMMARY OF THE INVENTION

The present invention is made in consideration of the above-described circumstances, and is to provide a technique capable of reducing a communication amount between storage devices that transfer data.

According to one embodiment, there is provided a storage device having a processor, the storage device being connected to another storage device capable of deduplicating and managing a data of a predetermined data unit in units of a predetermined division data unit via a network, in which, when the data of the data unit including a difference is transferred to the other storage device, the processor determines whether to transmit a difference portion to the other storage device or to transmit a finger print of a difference division data unit to the other storage device based on a size of the difference portion and a size of the finger print of the difference division data unit which is the division data unit including the difference portion, and in which the processor transmits the difference portion or the finger print to the other storage device according to a determination result.

According to the present invention, it is possible to reduce a communication amount between storage devices that transfer data.

BRIEF DESCRIPTION OF THE DRAWINGS

FIG. 3 is a configuration diagram of file virtualization management information according to the first embodiment;

FIG. 4 is a configuration diagram of a duplication state management table according to the first embodiment;

FIG. 5 is a configuration diagram of a duplication chunk management table according to the first embodiment;

FIG. 6 is a configuration diagram of a duplication determination table according to the first embodiment;

FIG. 7 is a configuration diagram of a transfer duplication chunk list according to the first embodiment;

DESCRIPTION OF EMBODIMENTS

Several embodiments will be described with reference to the drawings. It is noted that the embodiments described below do not limit the invention according to the claims, and all of elements and combinations of the elements described in the embodiments are not always indispensable for the means for solving the problems with respect to the invention.

In the description hereinafter, information may be described by an expression of an "AAA table", but the information may be expressed by any data structure. That is, in order to indicate that the information does not depend on the data structure, the "AAA table" can be referred to as "AAA information".

In addition, in the description hereinafter, a process may be described with a "program" as a subject of operation, but since the program is executed by allowing a processor (for example, a central processing unit (CPU)) to appropriately perform a specified process while using a storage unit (for example, a memory) and/or an interface device, the subject of operation of the process may be a processor (or a device or system having the processor). In addition, the processor may also include hardware circuits that perform a portion or all of the process. The program may be installed from a program source into a device such as a computer. The program source may be, for example, a program distribution server or a computer-readable recording medium (for example, a portable recording medium). In addition, in the description hereinafter, two or more programs may be implemented as one program, or one program may be implemented as two or more programs.

First Embodiment

In a computer system 1 according to a first embodiment, a core site 20 performs a variable-length deduplication process on a file (an example of a data unit). Herein, the variable-length deduplication is a process of dividing a data of the file into variable-length chunks (an example of division data units) by a predetermined method and performs deduplication in units of the variable-length chunk.

Figure 1:
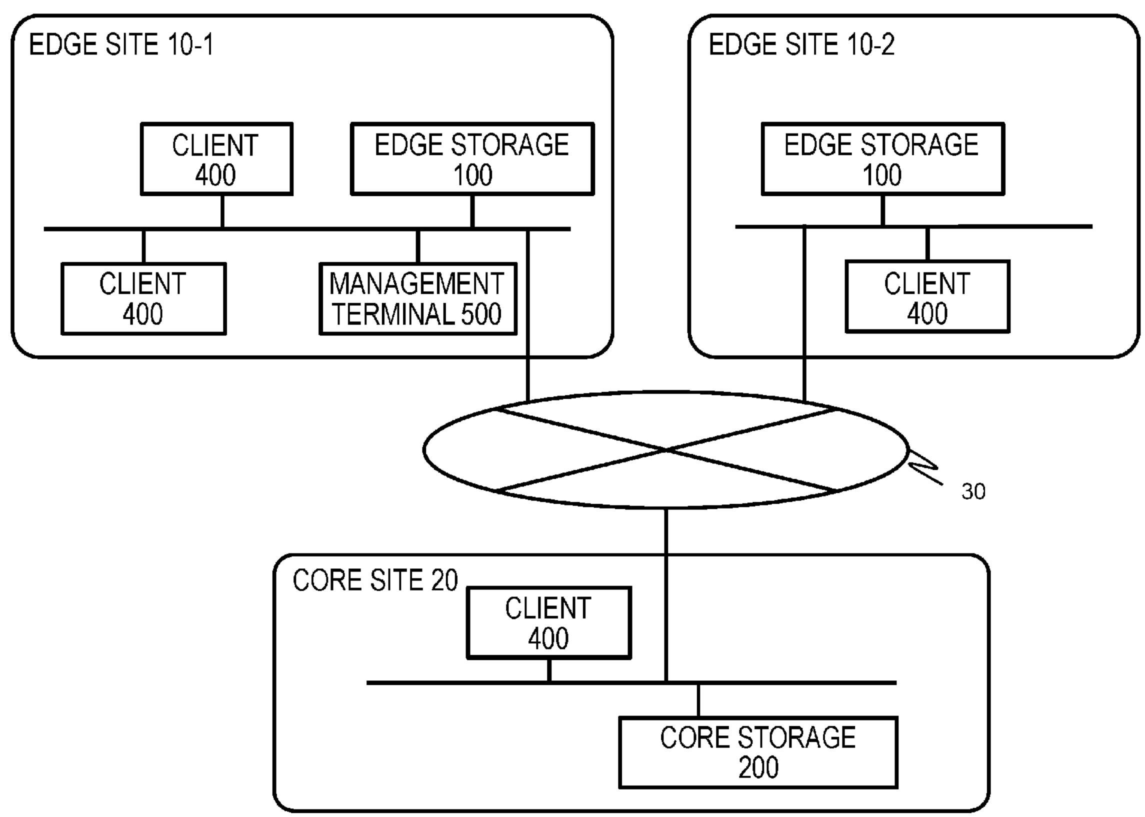
FIG. 1 is a diagram illustrating an example of a configuration of a computer system according to a first embodiment.

FIG. 1 is a diagram illustrating an example of a configuration of a computer system according to the first embodiment.

The computer system 1 has edge sites 10-1 and 10-2 and a core site 20. The edge sites 10-1 and 10-2 and the core site 20 are connected via a network 30. The network 30 is, for example, a WAN. It is noted that the network 30 is not limited to this, and various networks can be used. In addition, the computer system 1 illustrated in FIG. 1 includes two edge sites 10-1 and 10-2, but the number of edge sites is not limited to this.

The edge site 10-1 has an edge storage 100 as an example of a storage device (second storage device), a client 400, and a management terminal 500. The edge storage 100, the client 400, and the management terminal 500 are connected to each other by, for example, a local area network (LAN).

The edge storage 100 accesses the core storage 200 by using a protocol such as hypertext transfer protocol (HTTP). The specific configuration of the edge storage 100 will be described later.

The client 400 is an information processing device such as a computer capable of performing various types of information processing. The client 400 uses, for example, a storage service provided by the edge storage 100 by using a protocol such as a network file system (NFS), a common internet file system (CIFS), or a hypertext transfer protocol (HTTP).

The management terminal 500 manages the edge storage 100 and performs various operation instructions and the like to the edge storage 100 when there is an abnormality in the edge storage 100.

The edge site 10-2 has an edge storage 100 as an example of a storage device (second storage device) and a client 400. It is noted that the hardware configurations of the edge sites 10-1 and 10-2 illustrated in FIG. 1 are merely examples, and there is no limit to the number of hardware configurations as long as the hardware configuration has at least one edge storage 100 and one client 400, respectively, and the hardware configuration may have other hardware.

The core site 20 has a core storage 200 as an example of a storage device (first storage device) and a client 400. The core storage 200 functions as a backup destination for files (an example of a data unit) stored in the edge storages 100 of the edge sites 10-1 and 10-2.

Figure 2:
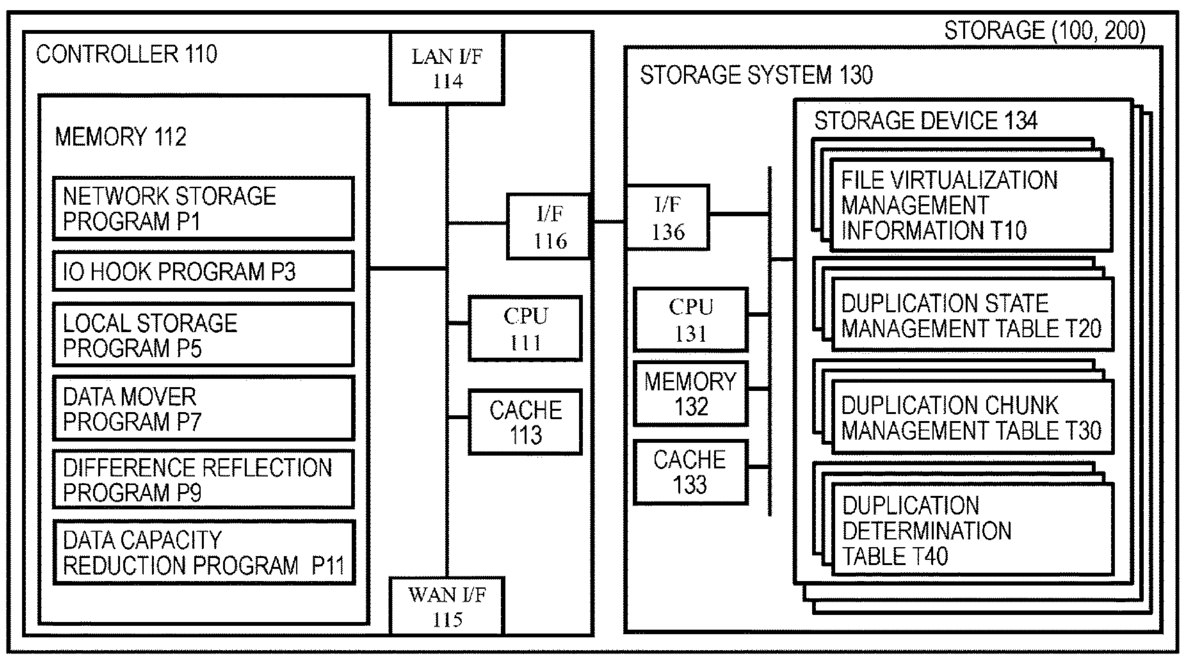
FIG. 2 is a diagram illustrating an example of a configuration of an edge storage and a core storage according to the first embodiment.

FIG. 2 is a diagram illustrating an example of a configuration of the edge storage and the core storage according to the first embodiment. It is noted that FIG. 2 illustrates an example in which any one of the edge storage 100 and the core storage 200 is configured as a storage having a function capable of operating.

The storage (the edge storage 100 and the core storage 200) includes a controller 110 and a storage system 130.

The controller 110 includes a CPU 111 as an example of a processor, a memory 112, a cache 113, a LAN interface (I/F) 114, a WAN I/F 115, and an I/F 116. These configurations are connected to each other by a communication path such as a bus.

The CPU 111 controls the operation of the controller 110 and the entire storage.

The memory 112 is, for example, a random access memory (RAM) and temporarily stores programs and data for executing operation control by the CPU 111. The memory 112 stores a network storage program P1, an IO hook program P3, a local storage program P5, a data mover program P7, a difference reflection program P9, and a data capacity reduction program P11. It is noted that the programs and the information stored in the memory 112 may be stored in a storage device 134 described later.

The network storage program P1 is executed by the CPU 111 to receive various requests such as read/write from the client 400 and the like and to process the protocol included in the requests. For example, the network storage program P1 processes protocols such as a network file system (NFS), a common internet file system (CIFS), and a hypertext transfer protocol (HTTP).

The IO hook program P3 is executed by the CPU 111 to detect an operation on the file stored in the storage system 130 by the network storage program P1. It is noted that the IO hook program P3 may set operations on directories and objects (examples of data units) as a detection target.

The local storage program P5 is executed by the CPU 111 to provide a file system and an object storage to the network storage program P1.

The data mover program P7 migrates, stubifies, or restores the files in the storage device 134 detected by the IO hook program P3 to the core storage 200.

The difference reflection program P9 is executed by the CPU 111 to receive the data update for the file from the data mover program P7 of another base (other site) and to reflect the data update in the storage device 134.

The data capacity reduction program P11 is executed by the CPU 111 to deduplicate the user files stored in the storage device 134 inline or in a post process.

It is noted that, in the first embodiment, when the storage illustrated in FIG. 2 is used as the edge storage 100, the difference reflection program P9 and the data capacity reduction program P11 are not executed, that is, deduplication and difference reflection in the edge storage 100 are not executed. Therefore, when the storage is used only as the edge storage 100, the difference reflection program P9 and the data capacity reduction program P11 may not be provided.

The cache 113 is, for example, a RAM and temporarily stores a data written from the client 400 and a data read from the storage system 130. The LAN I/F 114 communicates with other devices (client 400 and the like) in the site. The WAN I/F 115 communicates with the devices of other sites (other edge site 10, core site 20) via the network 30. The I/F 116 communicates with the storage system 130. It is noted that, in FIG. 1, the storage system 130 is connected to the I/F 116, but the storage device 134 may be connected.

The storage system 130 provides the controller 110 with a block-type storage function such as a fibre channel storage area network (FC-SAN). The storage system 130 includes a CPU 131 as an example of a processor, a memory 132, a cache 133, a storage device 134, and an I/F 136.

The CPU 131 controls the operation of the storage system 130. The memory 132 is, for example, a RAM and temporarily stores a program and a data for executing operation control of the CPU 131. The cache 133 temporarily stores a data written from the controller 110 and a data read from the storage device 134. The I/F 136 communicates between the storage device 134 and the controller 110. The storage device 134 is, for example, a hard disk, a flash memory, or the like and stores various files including a file (user file) used by the user of the client 400.

In addition, the storage device 134 stores file virtualization management information T10, duplication state management table T20, duplication chunk management table T30, and duplication determination table T40. Details of the information and the tables will be described later. It is noted that, in the first embodiment, when the storage illustrated in FIG. 2 is used as the edge storage 100, since the edge storage 100 does not perform deduplication, the storage device 134 may not store the duplication state management table T20, the duplication chunk management table T30, and the duplication determination table T40.

Next, the file virtualization management information T10 will be described.

FIG. 3 is a configuration diagram of file virtualization management information according to the first embodiment.

The file virtualization management information T10 is created for each user file. It is noted that, this example illustrates an example in which the file virtualization management information T10 is stored separately from the user file, but the file virtualization management information T10 may be stored in the user file. The file virtualization management information T10 has user file management information T11 and partial management information T12.

The user file management information T11 includes an access path C11, a file state C12, and a file ID C13.

The access path C11 is an address (access path) on the core storage 200 in which the user file corresponding to the file virtualization management information T10 is stored. The file state C12 indicates the state of the user file corresponding to the file virtualization management information T10. As the file state, there are "dirty" indicating that the user file has difference data that is not reflected in the core storage 200, "cached" indicating that the user file is stored in the core storage 200, and "stub" indicating that at least a portion of the area of the user file is stubified. The file ID C13 is an identifier (file ID) indicating the main body data of the user file corresponding to the file virtualization management information T10. The file ID is used for an operation on the main body data.

The partial management information T12 stores the entries corresponding to the corresponding portion when the user file is updated, added, or the like. The entries of the partial management information T12 include fields of an offset C16, a length C17, and a partial state C18.

The offset C16 stores the start position of the corresponding portion when the user file is updated or the like. The length C17 stores the data length from the start position of the portion corresponding to the entry. The partial state C18 stores the state (partial state) of the portion corresponding to the entry. As the partial state, there are "dirty" indicating that the partial data is not reflected to the core storage 200, that is, the partial data is updated (including "added") after the previous file migration process (refer to FIG. 8), "cached" indicating that the partial data is stored in the core storage 200, that is, the data exists in a local storage (in the edge storage 100) and in the core storage 200, and "stub" indicating that the partial data is stubbed, that is, the partial data is erased from the local storage (edge storage 100) after the file migration process (refer to FIG. 8).

Next, the duplication state management table T20 will be described.

FIG. 4 is a configuration diagram of a duplication state management table according to the first embodiment.

The duplication state management table T20 is created for each user file. The duplication state management table T20 includes a field of one file ID C21 and a field group (C22 to C27) for each chunk in the user file.

A file ID of a main body data of the user file corresponding to the duplication state management table T20 is stored in the file ID C21.

The field group for each chunk includes fields of an in-file offset C22, a chunk length C23, a data reduction processed flag C24, a chunk state C25, a duplication chunk storage file ID C26, and a reference offset C27.

The in-file offset C22 stores a start position of the chunk corresponding to the field group in the user file. The chunk length C23 stores a data length of the chunk corresponding to the field group. The data reduction processed flag C24 stores a data deletion processed flag indicating whether or not the chunk corresponding to the field group has been data-reduction-processed. The data deletion processed flag is set to "false" when the data in the chunk is updated, and is set to "true" after the data reduction processing. The chunk state C25 stores a chunk state corresponding to the field group. The chunk states include non-duplication which indicates that a chunk is not duplicated with another chunk and duplication which indicates that a chunk is duplicated with another chunk. It is noted that, for the chunk of which chunk state is non-duplication, no values are set for the duplication chunk storage file ID C26 and the reference offset C27. The duplication chunk storage file ID C26 stores an ID (file ID) of the file (duplication chunk storage file) that stores the data of the chunk duplicated with the chunk corresponding to the field group. The reference offset C27 stores an offset in the duplication chunk storage file that stores the data of the chunk (duplication chunk) that is duplicated with the chunk corresponding to the field group.

Next, the duplication chunk management table T30 will be described.

FIG. 5 is a configuration diagram of a duplication chunk management table according to the first embodiment.

The duplication chunk management table T30 is a table for managing a reference number of the duplication chunk stored in the duplication chunk storage file and stores entries for each duplication chunk storage file. The entries of the duplication chunk management table T30 include fields for a file ID C31, an offset C32, a chunk length C33, and a reference number C34.

The file ID C31 stores an ID (file ID) of a main body data of the duplication chunk storage file corresponding to the entry. The offset C32 stores a start position of each duplication chunk in the duplication chunk storage file corresponding to the entry. The chunk length C33 stores a data length of each duplication chunk. The reference number C34 stores the number (reference number) of times of being referenced from the user file of each duplication chunk.

Next, the duplication determination table T40 will be described.

FIG. 6 is a configuration diagram of a duplication determination table according to the first embodiment.

The duplication determination table T40 is a table that stores information used for duplication determination of the chunks and stores entries for each chunk stored in the core storage 200. The entries of the duplication determination table T40 include the fields of a finger print C41, a file ID C42, an offset C43, and a chunk length C44.

The finger print of the chunk corresponding to the entry is stored in the finger print C41. The finger print is a value obtained by applying a hash function to a data of the chunk and is used to confirm the identity (duplication) of chunks. As a method for calculating the finger print, for example, message digest algorithm 5 (MD5), secure hash algorithm 1 (SHA-1), or the like may be used. The file ID C42 stores a file ID of a file that stores the chunk corresponding to the entry. The offset C43 stores an offset in the file of the chunk corresponding to the entry. The chunk length C44 stores a data length of the chunk corresponding to the entry.

Next, a transfer duplication chunk list T50 used in the file migration process described later will be described.

FIG. 7 is a configuration diagram of a transfer duplication chunk list according to the first embodiment.

The transfer duplication chunk list T50 manages a storage destination on the core storage 200 for the chunk that is duplicated with the core storage 200 in the chunks (difference chunks: an example of the difference division data unit) having differences in the files that is a migration target (transfer target). The transfer duplication chunk list T50 stores entries for each chunk. The entries of the transfer duplication chunk list T50 include fields of an in-file offset C51, a chunk length C52, a duplication chunkable file ID C53, and a reference offset C54.

The in-file offset C51 stores an offset in the migration target file of the chunk corresponding to the entry. The chunk length C52 stores a data length of the chunk. The duplication chunk storage file ID C53 stores a file ID of the duplication chunk storage file on the core storage 200 that stores chunks that are duplicated with the chunk corresponding to the entry. The reference offset C54 stores an offset in the duplication chunk storage file that stores chunks that are duplicated with the chunk corresponding to the entry.

Next, a file migration process for migrating files in the computer system 1 according to the first embodiment will be described.

Figure 8:
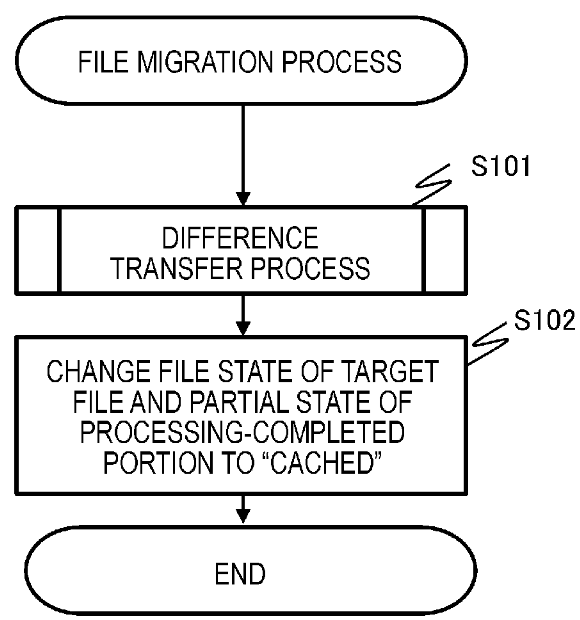
FIG. 8 is a flowchart of an example of a file migration process according to the first embodiment.

FIG. 8 is a flowchart of an example of the file migration process according to the first embodiment.

The file migration process is performed by allowing the CPU 111 of the controller 110 to execute the data mover program P7 in each edge storage 100. The file migration process may be performed, for example, periodically or irregularly when a predetermined condition is satisfied or may be executed when the client 400 performs an I/O operation on the edge storage 100. In the file migration process, the data mover program P7 acquires a file including a portion (difference portion) that is newly created or updated and becomes a difference, that is, a file of which file state C12 is "dirty" as a file (target file) that is a process target. The method of acquiring the file of which file state C12 is "dirty" may be a method of crawling the file system or a method of extracting from an operation log recording the operation of the file system.

S101: The data mover program P7 executes the difference transfer process (refer to FIG. 9). In the difference transfer process, a process of transferring the difference portion of the target file to the core storage 200 and reflecting the difference portion is performed.

S102: The data mover program P7 changes the file state C12 of the target file and the partial state C18 corresponding to the difference portion of the target file to "cached", and ends the file migration process.

Next, a difference transfer process in step S101 will be described.

Figure 9:
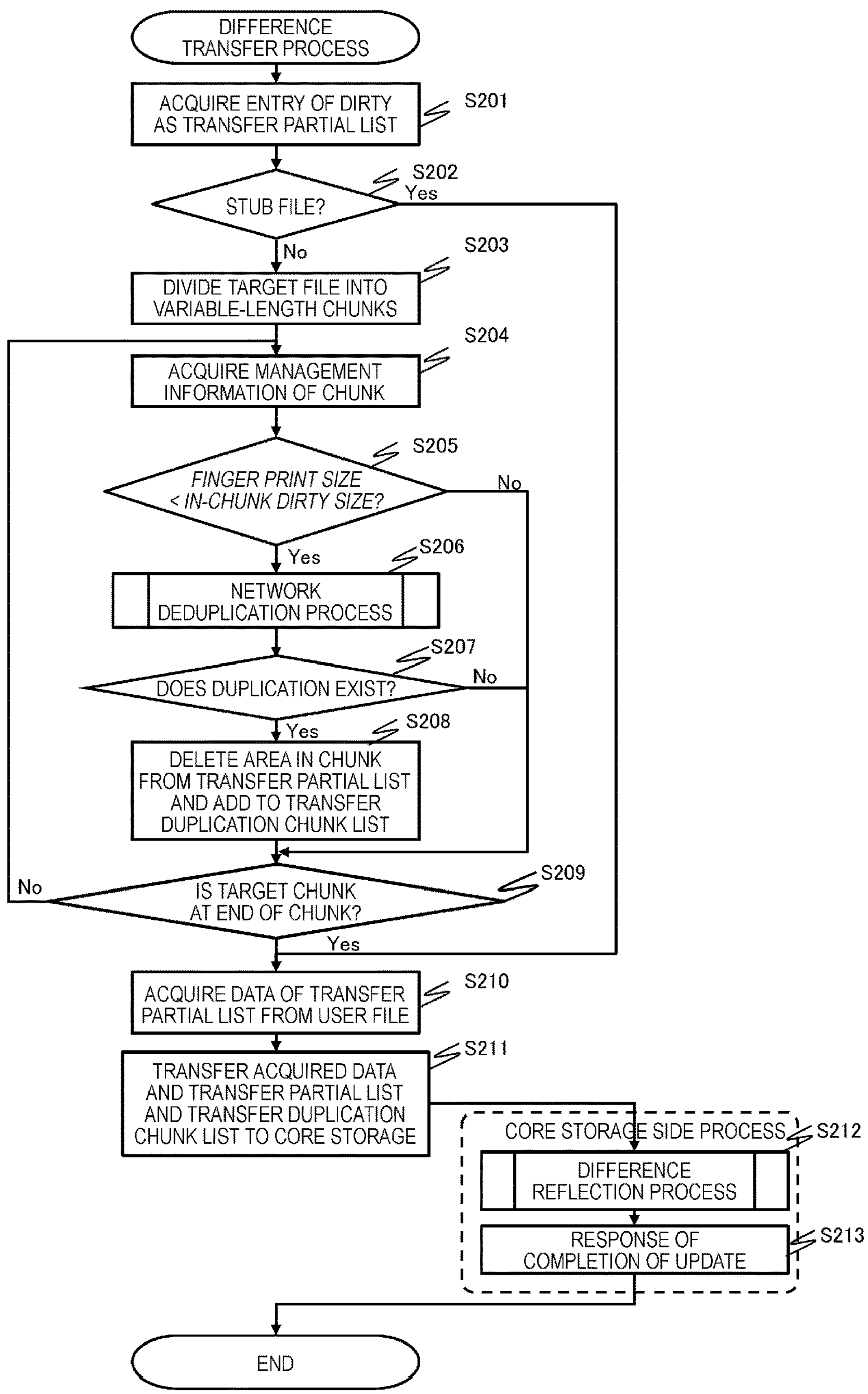
FIG. 9 is a flowchart of an example of a difference transfer process according to the first embodiment.

FIG. 9 is a flowchart of an example of the difference transfer process according to the first embodiment.

The difference transfer process is basically a process of transferring the difference portion between the file created in the edge storage 100 and the updated file to the core storage 200 that performs the variable-length deduplication and reflecting the difference portion in the core storage 200.

S201: The data mover program P7 acquires an entry (corresponding to a transfer target portion) in which the partial state C18 is "dirty" from the partial management information T12 of the target file as a transfer partial list.

S202: The data mover program P7 checks whether or not the target file is a stub file including a stubified area, that is, whether or not the file state C12 of the target file is "stub". As a result, when the target file is a stub file (YES in S202), the data mover program P7 allows the process to proceed to step S210 without performing a network deduplication process (S206) or the like for the data of the transfer target portion. Herein, when the target file is a stub file, the network deduplication process or the like is not performed because an amount of data to be transferred in the recall processing or the like of the stubified data cannot be easily estimated. On the other hand, when the target file is not a stub file (NO in S202), the data mover program P7 allows the process to proceed to step S203.

S203: The data mover program P7 divides the target file into chunks (variable-length chunks) having a variable length by using a rolling hash or the like. Herein, the rolling hash is a process of performing a process of calculating a hash value for a window data having a predetermined length for the target file while shifting the window, and as a method of dividing the target file into variable-length chunks, there is a method of using a portion as a division point of the variable-length chunk when the calculated hash value reaches a predetermined value. As a specific process of dividing the target file into the variable-length chunks, for example, a Rabin-Karp algorithm can be employed. It is noted that the process of dividing the target file into the variable-length chunks is not limited to the above-mentioned process, and any process may be used.

The following steps S204 to 209 are executed for each chunk (variable-length chunk) divided in S203.

S204: The data mover program P7 acquires management information (in-file offset, chunk length, or the like) of a target chunk by setting one chunk of each divided chunk as a chunk (target chunk) that is a process target.

S205: The data mover program P7 determines whether or not the size of the portion (difference portion) in which the partial state in the target chunk is "dirty" (in-chunk dirty size) is larger than the finger print size of the chunk used in the network deduplication process (S206) described later. Herein, the chunk including the portion (difference portion) of which partial state is "dirty" in the target chunk corresponds to the difference chunk. As a result, when the in-chunk dirty size is larger than the finger print size (YES in S205), there is a possibility that the effect of reduction of the transfer of duplicated data can be obtained by executing the network deduplication process, so that the data mover program P7 allows the process to proceed to step S206. On the other hand, when the in-chunk dirty size is not larger than the finger print size (NO in S205), since the amount of transferred data in the case of transmitting the dirty data (difference data) in the chunk is smaller than that in the case of executing the network deduplication process, the data mover program P7 allows the process to proceed to step S209 without performing the network deduplication process. It is noted that, in this case, in the subsequent process, the difference data in the chunk will be transmitted to the core storage 200.

It is noted that the determination of whether or not the network deduplication process can be executed based on the in-chunk dirty size and the finger print size described above is a preferable example when the probability that the same data as the chunk of the target file is expected to exist in the core storage 200 (network deduplication rate: prediction rate) is 100% or a value close to 100%. The determination of whether or not the network deduplication process can be executed by using the in-chunk dirty size and the finger print size is not limited to the above comparison.

In addition, in addition to the in-chunk dirty size and finger print size described above, the network deduplication rate may be used to determine whether or not the network deduplication process can be executed. For example, when finger print size+in-chunk dirty size×(1−network deduplication rate)<(in-chunk dirty size) is satisfied, the process may be allowed to proceed to step S206, and when the condition is not satisfied, the process may be allowed to proceed to step S209.

For example, the network deduplication rate may be determined based on attributes of the file. For example, when the attribute of the file is an encrypted file, since there is a low possibility that the state is determined to be "duplication", the network deduplication rate may be set to a low rate (for example, 10%), and when the file attribute indicates, for example, a file of word processor software such as Microsoft Office (registered trade mark) or a file of spreadsheet software or the like, there is a relatively high possibility that the state is determined to be "duplication", the network deduplication rate may be set to a high rate (for example, 80%), so that the condition of step S205 may be changed according to the attributes of the file.

S206: The data mover program P7 transmits the finger print of the target chunk to the core storage 200 and executes the network deduplication process (refer to FIG. 10) in which the core storage 200 determines the duplication of the target chunk. It is noted that, in this example, step S206 is executed for each chunk, but all the chunks satisfying the condition of step S205 may be collectively processed in step S206.

S207: The data mover program P7 determines whether or not the data duplicated with the target chunk exists in the core storage 200 based on the result of the network deduplication process S206. As a result, when there is data duplicated with the target chunk (YES in S207), the data mover program P7 allows the process to proceed to step S208. On the other hand, when there is no data duplicated with the target chunk (NO in S207), the data mover program P7 allows the process to proceed to step S209.

S208: data mover program P7 deletes the area in the target chunk from the transfer partial list and adds entries including the in-file offset of the target chunk, the chunk length, the file ID of the chunk on the core storage 200 duplicated with the chunk, the reference offset in the transfer duplication chunk list T50.

S209: The data mover program P7 determines whether or not the target chunk is at the end of the chunk (end of chunk). When the target chunk is at the end of the chunk (YES in S209), the data mover program P7 allows the process to proceed to step S210. On the other hand, when the target chunk is not at the end of the chunk (NO in S209), the data mover program P7 allows the process to proceed to step S204 and performs the process for the next chunk.

S210: The data mover program P7 acquires the data of the portion recorded in the transfer partial list from the main body file of the user file by using the file ID.

S211: The data mover program P7 acquires the access path (value of the access path C11 of the target file) of the target file to the core storage 200 and requests the core storage 200 to update the access path. At this time, the data mover program P7 transfers the data acquired in step S210, the transfer partial list, and the transfer duplication chunk list T50.

S212: The difference reflection program P9 (strictly speaking, the CPU 111 that executes the difference reflection program P9) of the core storage 200 receives an update request from the edge storage 100 and performs the difference reflection process (refer to FIG. 11) on the access path specified in the update request.

S213: The difference reflection program P9 returns a response that the update is completed to the edge storage 100. It is noted that, when the data mover program P7 of the edge storage 100 receives the response, the difference transfer process is ended.

Next, the network deduplication process in step S206 will be described.

Figure 10:
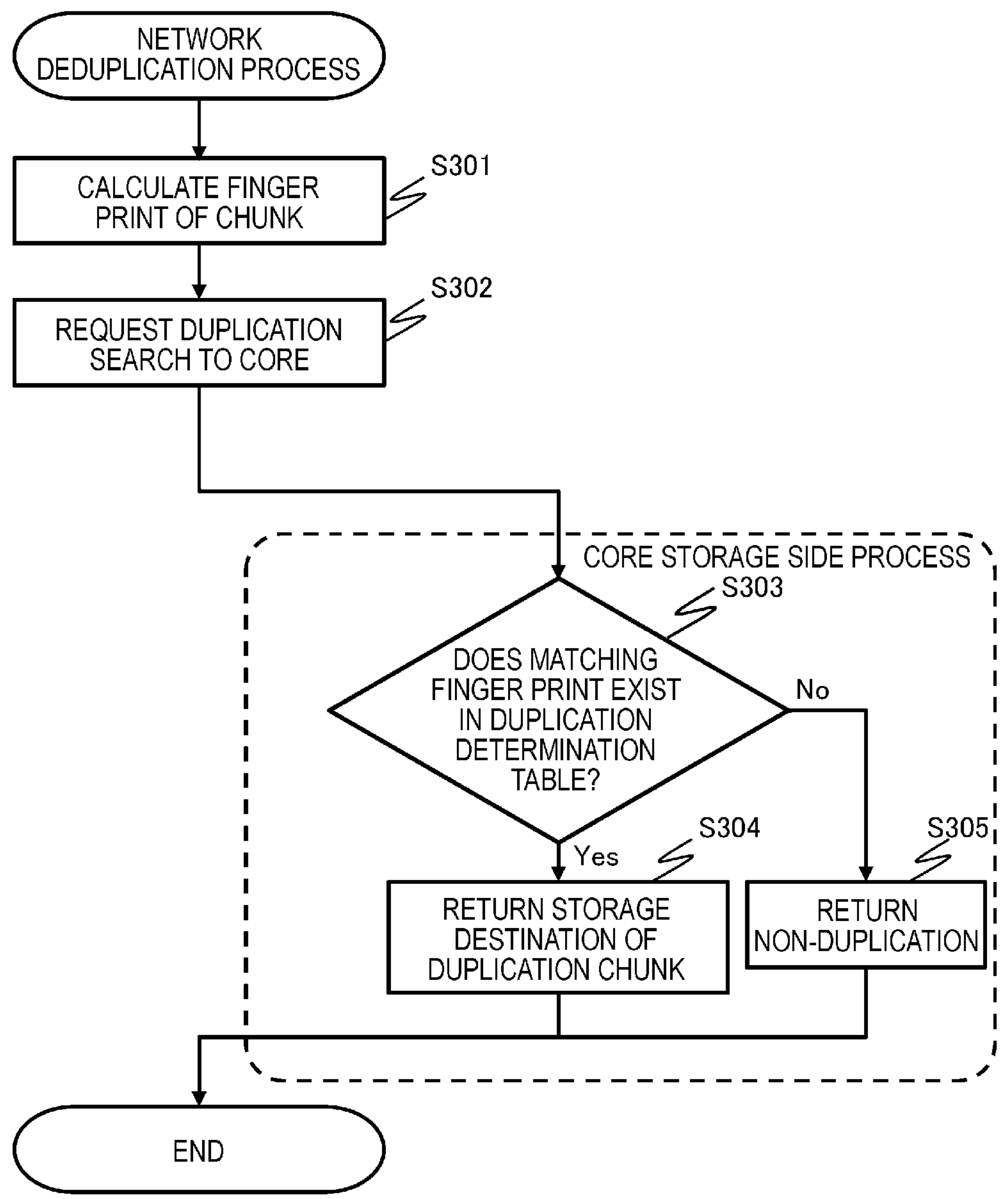
FIG. 10 is a flowchart of an example of a network deduplication process according to the first embodiment.

FIG. 10 is a flowchart of an example of the network deduplication process according to the first embodiment.

The network deduplication process is a process of checking whether or not the same chunk as the edge storage 100 exists in the core storage 200 and acquiring a storage destination of the duplication chunk when the chunk exists.

S301: The data mover program P7 calculates the finger print of the target chunk. The finger print may be, for example, a hash value calculated by SHA-1 for the target chunk.

S302: The data mover program P7 transmits a request (duplication search request) for checking whether or not there exists the same data as the target chunk in the core storage 200. The duplication search request includes the finger print of the target chunk calculated in step S301.

S303: The data capacity reduction program P11 of the core storage 200 receives the duplication search request from the edge storage 100 and checks whether or not there exists a chunk (duplication chunk) matching the finger print (target finger print) included in the duplication search request by referring to the duplication determination table T40. As a result, when there exist a chunk matching the finger print (YES in S303), the data capacity reduction program P11 allows the process to proceed to step S304. On the other hand, when there is no chunk matching the finger print (NO in S303), the data capacity reduction program P11 allows the process to proceed to step S305.

It is noted that, when the file that stores the chunks matching the finger print is not a duplication chunk storage file but a user file and the chunk state of the chunk state C25 in the duplication state management table T20 is non-duplication, the finger print of the chunk of the file may be recalculated to check that the finger prints is not changed, that is, the chunk is not updated. Furthermore, the deduplication of the target chunk may be performed, the chunk may be stored in the duplication chunk storage file, and the file ID or the like of the entry corresponding to the chunk in the duplication determination table T40 may be updated to the file ID or the like of the duplication chunk storage file.

S304: The data capacity reduction program P11 of the core storage 200 returns the values of the file ID C42, the offset C43, and the chunk length C44 of the entries matching the target finger print of the duplication determination table T40 to the edge storage 100 and ends the network deduplication process.

S305: The data capacity reduction program P11 of the core storage 200 returns the fact that the same data as the target chunk does not exist to the edge storage 100 and ends the network deduplication process.

Next, the difference reflection process in step S212 will be described.

Figure 11:
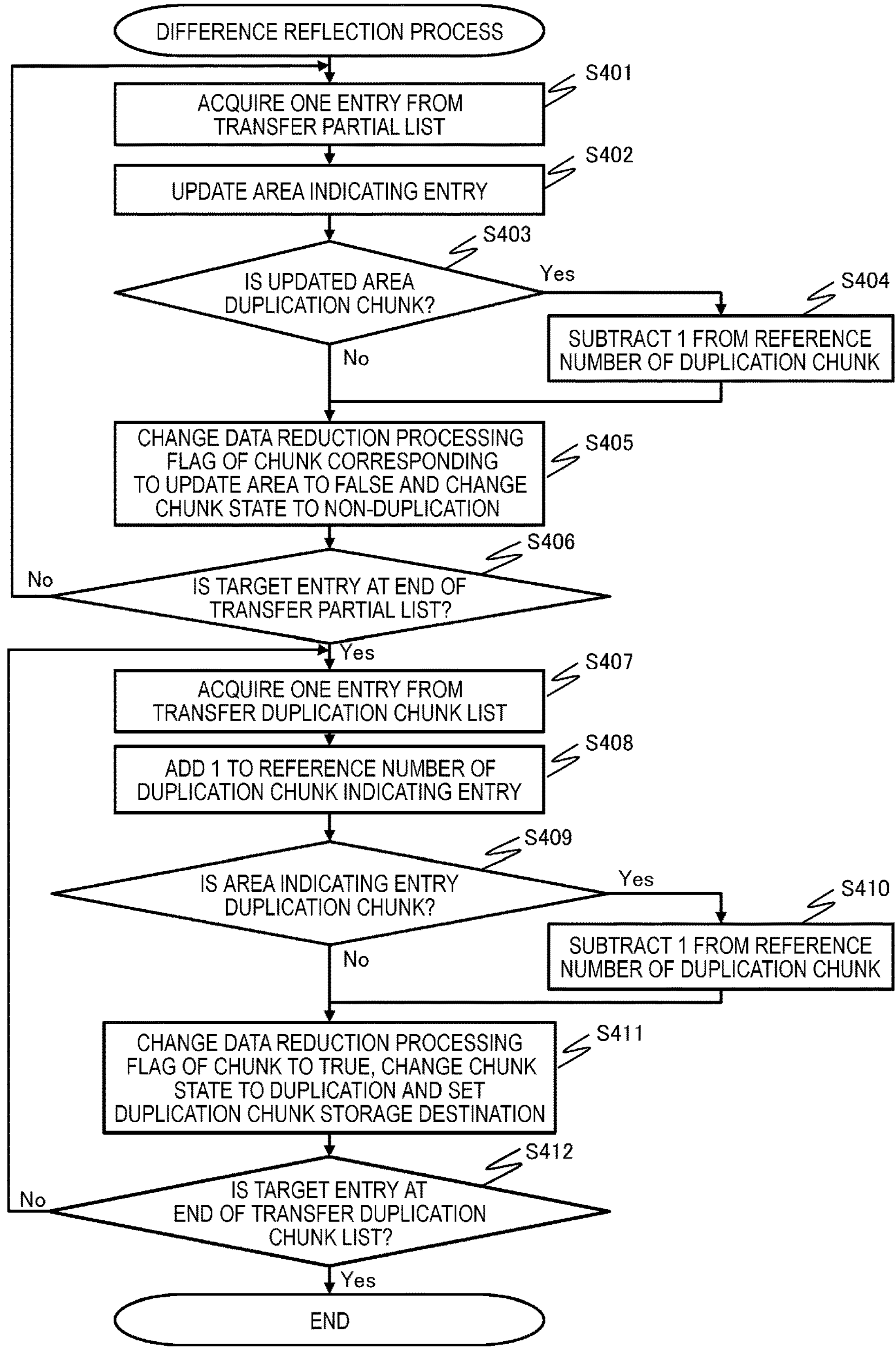
FIG. 11 is a flowchart of an example of a difference reflection process according to the first embodiment.

FIG. 11 is a flowchart of an example of the difference reflection process according to the first embodiment.

The difference reflection process is a process of allowing the difference reflection program P9 of the core storage 200 to receive the update request of the edge storage 100 and performing reflection of the update using the specified transfer partial list and reflection of the deduplication result using the transfer duplication chunk list T50 for the access path specified in the update request.

S401: The difference reflection program P9 acquires one entry (target entry) from the received transfer partial list.

S402: The difference reflection program P9 reflects the update of the area (update area, difference area) indicated by the target entry for the access path specified in the update request.

S403: The difference reflection program P9 checks whether or not an entry of which chunk state of the chunk state C25 is duplication is included in the update area of the file corresponding to the access path specified in the update request by referring to the duplication state management information T20. As a result, when an entry of which chunk state is duplication is included (YES in S403), the difference reflection program P9 allows the process to proceed to step S404. On the other hand, when the entry of which chunk state is duplication is not included (NO in S403), the difference reflection program P9 allows the process to proceed to step S405.

S404: The difference reflection program P9 subtracts 1 from the reference number of the reference number C34 in the entry of the duplication chunk management table T30 corresponding to the file ID of the duplication chunk storage file ID C26 and the reference offset of the reference offset C27 in the entry of which chunk state is duplication.

S405: The difference reflection program P9 changes the value of the data reduction processed flag C24 in the entry corresponding to the update area of the duplication state management table T20 to "false" and changes the value of the chunk state C25 to "non-duplication".

S406: The difference reflection program P9 checks whether or not the target entry is at the end of the transfer partial list. As a result, when the target entry is at the end (YES in S406), the difference reflection program P9 allows the process to proceed to step S407. On the other hand, when the target entry is not at the end (NO in S406), the difference reflection program P9 allows the process to proceed to step S401 and performs the subsequent process with the next entry as a process target.

S407: The difference reflection program P9 acquires one entry of the received transfer duplication chunk list T50 as an entry (target entry) that is a process target.

S408: The difference reflection program P9 adds 1 to the reference number of the reference number C34 of the entry of the duplication chunk management table T30 corresponding to the file ID of the duplication chunk storage file ID C53 of the target entry and the reference offset of the reference offset C54.

S409: The difference reflection program P9 checks whether or not a chunk (duplication chunk) of which the chunk state C25 is "duplication" is included in the area corresponding to the offset of the in-file offset C51 of the target entry of the transfer duplication chunk list T50 and the chunk length of the chunk length C52 by referring to the duplication state management information T20 of the file corresponding to the access path specified in the update request. As a result, when the duplication chunk is included (YES in S409), the difference reflection program P9 allows the process to proceed to step S410. On the other hand, when the duplication chunk is not included (NO in S409), the difference reflection program P9 allows the process to proceed to step S411.

S410: The difference reflection program P9 subtracts 1 from the reference number of the reference number C34 in the entry of the duplication chunk management table T30 corresponding to the file ID of the duplication chunk storage file ID C26 of the entry of the duplication chunk of the duplication state management information T20 and the offset of the reference offset C27.

S411: The difference reflection program P9 sets the in-file offset C22 and the chunk length C23 to the offset of the in-file offset C51 and the chunk length of the chunk length C52 of the target entry of the transfer duplication chunk list T50 in the entry of the duplication chunk of the duplication state management information T20, sets the data reduction processed flag C24 to "true", sets the chunk state C25 to "duplication", and sets the duplication chunk storage file ID C26 and the reference offset C27 to the file ID of the duplication chunk storage file ID C53 and the offset of the reference offset C54 of the target entry of the transfer duplication chunk list T50.

S412: The difference reflection program P9 checks whether or not the target entry is at the end of the transfer duplication chunk list T50. As a result, when the target entry is at the end (YES in S412), the difference reflection program P9 ends the difference reflection process. On the other hand, when the target entry is not at the end (NO in S412), the difference reflection program P9 allows the process to proceed to step S407 and performs the subsequent process for the next entry.

According to the above-mentioned file migration process, since it is determined whether to perform the network deduplication process (S206) or to transmit the dirty data without performing the network deduplication process (S211) based on the finger print size and the in-chunk dirty size, the transfer amount of the data between the edge storage 100 and the core storage 200 can be suppressed.

Second Embodiment

Next, a computer system according to a second embodiment will be described. It is noted that elements similar to those of the computer system according to the first embodiment are denoted by the same reference numerals, and duplicate description may be omitted.

A configuration of the computer system according to the second embodiment is the same as that of the computer system illustrated in FIG. 1.

The configuration of the edge storage 100 and the core storage 200 according to the second embodiment is the same as those of the edge storage 100 and the core storage 200 according to the first embodiment illustrated in FIG. 2. It is noted that the data capacity reduction program P11 in the second embodiment is different in that deduplication (fixed-length deduplication) is performed for chunks (fixed-length chunks: an example of division data units) of the fixed length.

The file virtualization management information T10 according to the second embodiment is the same as the file virtualization management information T10 according to the first embodiment illustrated in FIG. 3.

The duplication state management table T20 according to the second embodiment is the same as the duplication state management table T20 according to the first embodiment illustrated in FIG. 4. It is noted that, in the second embodiment, since the data capacity reduction program P11 performs fixed-length deduplication, the field of the chunk length C23 may not be present in the duplication state management table T20.

The duplication chunk management table T30 according to the second embodiment is the same as the duplication chunk management table T30 according to the first embodiment illustrated in FIG. 5. It is noted that, in the second embodiment, since the data capacity reduction program P11 performs fixed-length deduplication, the field of the chunk length C33 may not be present in the duplication chunk management table T30.

The duplication determination table T40 according to the second embodiment is the same as the duplication determination table T40 according to the first embodiment illustrated in FIG. 6. It is noted that, in the second embodiment, since the data capacity reduction program P11 performs fixed-length deduplication, the field of the chunk length C44 may not be present in the duplication determination table T40.

The transfer duplication chunk list T50 according to the second embodiment is the same as the transfer duplication chunk list T50 according to the first embodiment illustrated in FIG. 7. It is noted that, in the second embodiment, since the data capacity reduction program P11 performs fixed-length deduplication, the field of the chunk length C52 may not be present in the transfer duplication chunk list T50.

The file migration process according to the second embodiment is the same as the file migration process according to the first embodiment illustrated in FIG. 8. However, in the file migration process according to the second embodiment, the difference transfer process illustrated in FIG. 12 is performed as the difference transfer process in step S101.

Next, the difference transfer process will be described.

Figure 12:
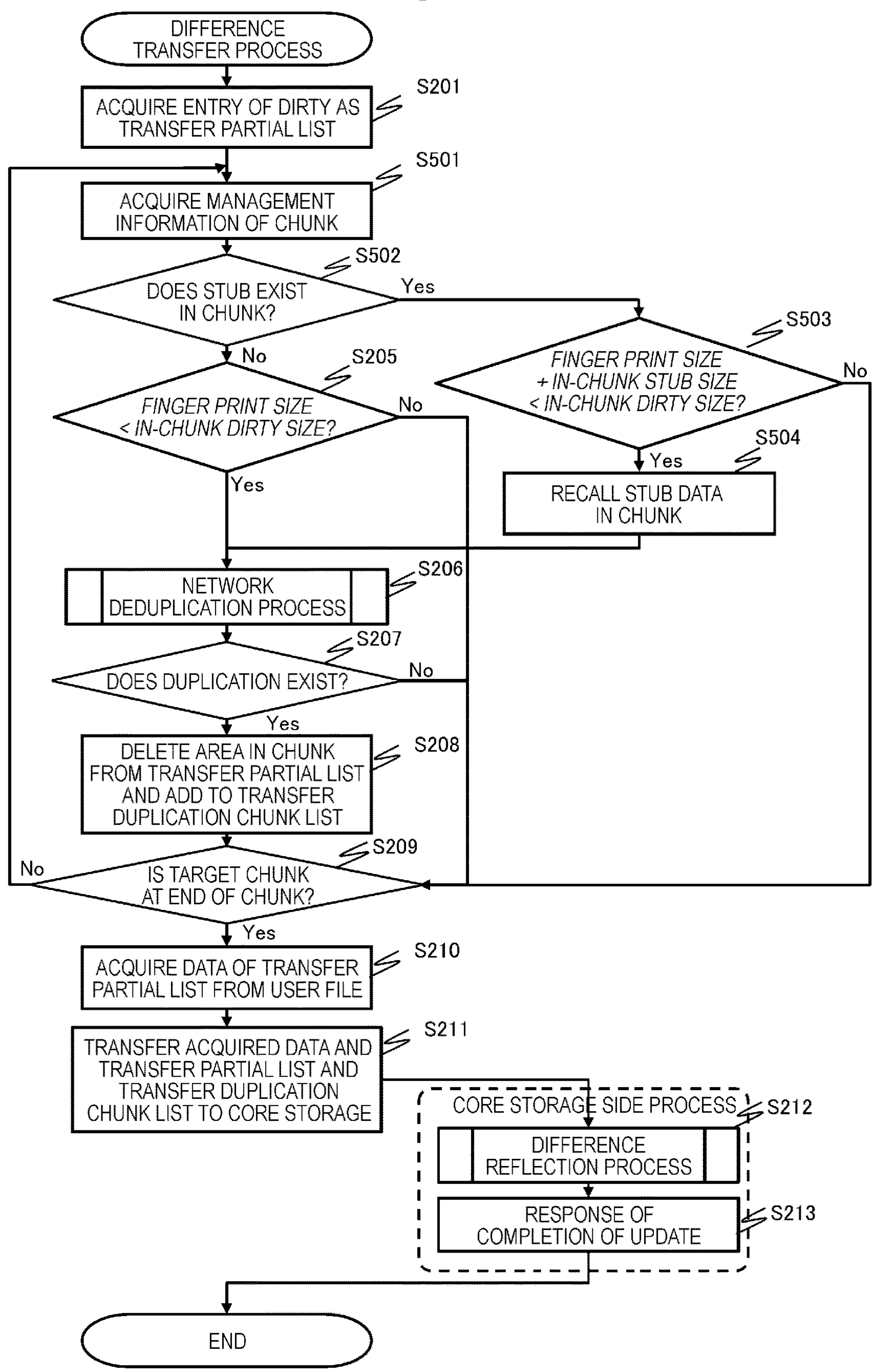
FIG. 12 is a flowchart of an example of a difference transfer process according to a second embodiment.

FIG. 12 is a flowchart of an example of the difference transfer process according to the second embodiment. It is noted that elements similar to those of the difference transfer process illustrated in FIG. 8 are denoted by the same reference numerals, and duplicate description may be omitted.

The difference transfer process is basically a process of transferring the difference portion between the file created and the file updated in the edge storage 100 to the core storage 200 that performs fixed-length deduplication and reflecting the difference portion in the core storage 200.

The processing of following steps S501 to 504 and S205 to S209 is executed for each fixed-length chunk that is divided into fixed length units for the file. It is noted that the processing after step S501 may be performed only for the fixed-length chunks included in the transfer portion of the transfer partial list.

S501: The data mover program P7 acquires the management information (in-file offset, chunk length, or the like) of the target chunk by setting one chunk of each fixed-length chunks as the chunk (target chunk) that is a process target.

S502: The data mover program P7 checks whether or not a stubified area (stub area) is included in the target chunk, specifically, checks whether or not there exists a portion in which the partial state C18 in the target chunk is "stub" by referring to the partial management information T12. As a result, when the stub area exists in the target chunk (YES in S502), the data mover program P7 allows the process to proceed to step S503. On the other hand, when the stub area does not exist in the target chunk (NO in S502), the data mover program P7 allows the process to proceed to step S205.

S503: The data mover program P7 checks whether or not the size of the portion (difference portion) of which the partial state in the target chunk is "dirty" (in-chunk dirty size) is larger than the size obtained by adding the size (in-chunk stub size) of the stub area in the chunk to the finger print size used in the network deduplication process S206 (that is, the total data size to be transferred when the data of the stub area is recalled and the finger print size is transferred). As a result, when the in-chunk dirty size is large (YES in S503), in case of recalling the data of the stub area and transmitting the finger print, there is a possibility that the data amount can be suppressed, so that the data mover program P7 allows the process to proceed to step S504. On the other hand, when the in-chunk dirty size is not large (NO in S503), case of transferring the data of the difference portion denotes that the data amount can be suppressed, so that the data mover program P7 allows the process to proceed to step S209.

It is noted that the determination of whether or not the network deduplication process can be executed based on the in-chunk dirty size, the finger print size, and the in-chunk stub size described above is a preferable example when the probability (network deduplication rate: prediction rate) of the prediction that the same data as the chunk of the target file exists in the core storage 200 is 100% or a value close to 100%. The determination of whether or not the network deduplication process can be executed by using the in-chunk dirty size, the finger print size, and the in-chunk stub size is not limited to the above-described comparison.

In addition, in addition to the in-chunk dirty size, the finger print size, and the in-chunk stub size described above, the network deduplication rate may be used to determine whether or not the network deduplication process can be executed. For example, if finger print size+in-chunk stub size+in-chunk dirty size×(1−network deduplication rate)< (in-chunk dirty size) is satisfied, the process is allowed to proceed to step S504, and when the condition is not satisfied, the process is allowed to proceed to step S209.

S504: The data mover program P7 recalls (reads) the data of the stub area in the chunk from the core storage 200 and allows the process to proceed to step S206. In step S206 and subsequent steps, since the chunk length is fixed in the second embodiment, the process related to the chunk length may be skipped.

According to the second embodiment described above, even when the stub area is included in the chunk, the transfer amount of the data between the edge storage 100 and the core storage 200 can be suppressed.

Third Embodiment

Next, a computer system according to a third embodiment will be described. It is noted that elements similar to those of the computer system according to the first embodiment are denoted by the same reference numerals, and duplicate description may be omitted.

A configuration of the computer system according to the third embodiment is the same as that of the computer system illustrated in FIG. 1.

A configuration of the edge storage 100 and the core storage 200 according to the third embodiment is the same as that of the edge storage 100 and the core storage 200 according to the first embodiment illustrated in FIG. 2. It is noted that the third embodiment is different in that the data capacity reduction program P11 operates in the edge storage 100 to perform the variable-length deduplication. It is noted that the data capacity reduction program P11 may not operate in the core storage 200 or may operate to perform the same deduplication as in the first embodiment.

The file virtualization management information T10 according to the third embodiment is the same as the file virtualization management information T10 according to the first embodiment illustrated in FIG. 3, but the file virtualization management information T10 according to the third embodiment is stored in the edge storage 100.

The duplication state management table T20 according to the third embodiment is the same as the duplication state management table T20 according to the first embodiment illustrated in FIG. 4 and is stored in the edge storage 100.

The duplication determination table T40 according to the third embodiment is the same as the duplication determination table T40 according to the first embodiment illustrated in FIG. 6 and is stored in the edge storage 100.

In the third embodiment, the transfer duplication chunk list T50 is unnecessary.

Next, the deduplication process of the stub file according to the third embodiment will be described.

Figure 13:
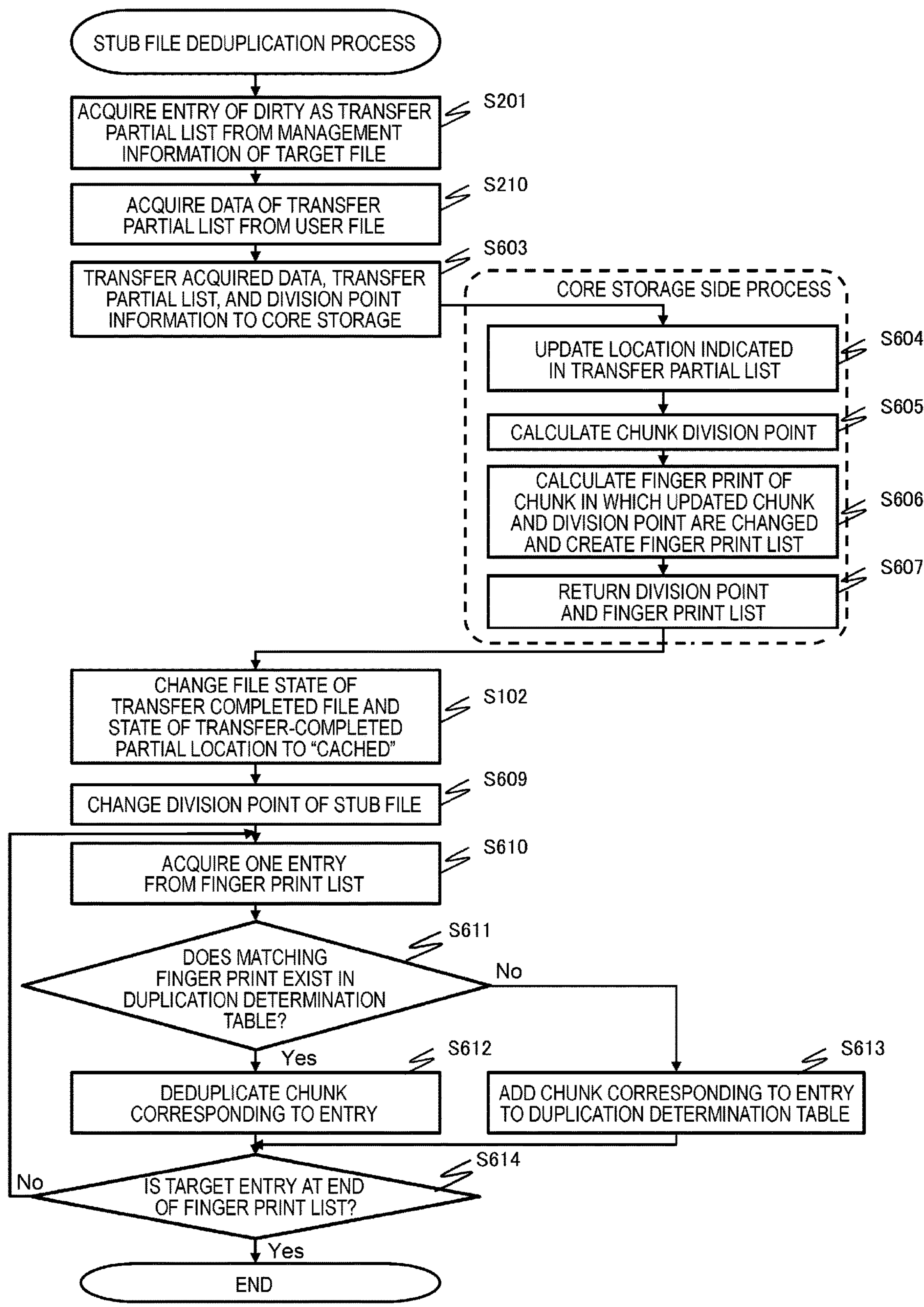
FIG. 13 is a flowchart of an example of a stub file deduplication process according to a third embodiment.

FIG. 13 is a flowchart of an example of the deduplication process of the stub file according to the third embodiment. It is noted that elements similar to those of the processes illustrated in FIGS. 8 and 9 are denoted by the same reference numerals, and duplicate description may be omitted.

The deduplication process of the stub file is performed by allowing the CPU 111 of the controller 110 to execute the data capacity reduction program P11 in each edge storage 100. The stub file deduplication process may be performed, for example, periodically or irregularly when a predetermined condition is satisfied or may be executed when the client 400 performs an I/O operation (for example, a data write operation) on the edge storage 100.

S603: The data mover program P7 of the edge storage 100 acquires the access path (value of the access path C11 of the target file) to the core storage 200 from the user file management information T11 corresponding to the target file and requests the core storage 200 to perform the update of the access path and the calculation of the finger print of the update area. At this time, the data mover program P7 transfers the data acquired in S210, the transfer partial list, and the information (division point information) on the division point of the chunk of the target file.

S604: The difference reflection program P9 of the core storage 200 reflects the update of the area (update area and difference area) indicated by each entry of the transfer partial list for the access path specified in the update request.

S605: The difference reflection program P9 divides the updated file into variable-length chunks by processes of rolling hash and the like and calculates the division points of the chunk.

S606: The difference reflection program P9 compares the calculated division points with the received division point information to calculate the finger print of the chunk of which division points are changed and the chunk of which data is updated, and creates a finger print list including the calculated offset of the chunk, the chunk length, and the entry that stores the finger print.

S607: The difference reflection program P9 returns the calculated division point information (after-change division point information) and the finger print list to the edge storage 100.

S609: The data mover program P7 returns the after-change division point information and the finger print list to the data capacity reduction program P11. The data capacity reduction program P11 updates the duplication state management information T20 based on the returned after-change division point information. Herein, the data capacity reduction program P11 changes the value of the data reduction processed flag C24 to "false" and changes the value of the chunk state C25 to "non-duplication" in the entry corresponding to the chunk of which division points are changed. It is noted that, when the chunk state C25 of the entry is duplication, the data capacity reduction program P11 subtracts 1 from the reference number of the reference number C34 in the entry of the duplication chunk management table T30 corresponding to the file ID of the duplication chunk storage file ID C26 and the offset of the reference offset C27.

S610: The data capacity reduction program P11 acquires one entry (target entry) that is a process target from the finger print list.

S611: The data capacity reduction program P11 checks whether or not there exists an entry matching the finger print of the target entry in the duplication determination table T40. As a result, if there exists a matching entry, the data capacity reduction program P11 allows the process to proceed to step S612. If the matching entry does not exist, the data capacity reduction program P11 allows the process to proceed to step S613.

S612: The data capacity reduction program P11 deduplicates the chunks corresponding to the target entries.

S613: The data capacity reduction program P11 adds chunks corresponding to the target entries to the duplication determination table T40.

S614: The data capacity reduction program P11 determines whether or not the target entry is at the end of the finger print list. As a result, when the target entry is at the end, the data capacity reduction program P11 ends the deduplication process of the stub file. On the other hand, when the target entry is not at the end of the finger print list, the data capacity reduction program P11 allows the process to proceed to step S610 and performs the subsequent process with the next entry as the process target.

It is noted that, the example of performing the variable-length deduplication in the edge storage 100 has been illustrated, but the present invention is not limited thereto, and the fixed-length deduplication may be performed in the edge storage 100. In this case, without performing the division point calculation in step S605, the finger print is calculated only for the updated chunk, and thus, the process of step S609 may not be performed.

In the third embodiment, the file migration process may be the same as the process of the first embodiment illustrated in FIG. 8. In addition, in the third embodiment, the difference transfer process in step S101 may not perform steps S202 to S208 in the difference transfer process in the first embodiment illustrated in FIG. 9. In addition, in the third embodiment, the difference reflection process in step S212 may not perform steps S403 to 405 and S407 to S412 in the difference reflection process in the first embodiment illustrated in FIG. 11.

In the third embodiment described above, when the file is a stub file having a stub area, the data of the stub area of the file is not transmitted from the core storage 200 to the edge storage 100, so that the transfer amount of the data between the edge storage 100 and the core storage 200 can be suppressed.

It is noted that the present invention is not limited to the above-described embodiment and can be appropriately modified and implemented without departing from the spirit of the present invention.

For example, in the difference transfer process in the above embodiment, in step S205, it is determined whether to perform the network deduplication process or to transmit the difference portion based on the finger print size and the in-chunk dirty size, but the present invention is not limited thereto. It may be determined whether to transmit the difference portion to the core storage 200 or to transmit the finger print of the difference chunk to the core storage 200 based on a first total amount as a sum of a charge amount in communication based on the size of the difference portion of the chunk and a charge amount for the network deduplication process of determining duplication with the chunk of the core storage 200 for the difference chunk in the core storage 200 by using the difference portion of the chunk (difference chunk) including the difference and a second total amount as a sum of a charge amount in communication based on the size of the finger print of the chunk and a charge amount for the process of determining duplication with the chunk of the core storage 200 for the difference chunk in the core storage 200 by using the finger print of the difference chunk.

Specifically, when the formula of (charge amount per network transfer amount)*(finger print size+in-chunk dirty size×(1−network deduplication rate))+(charge amount per calculation amount)*(calculation amount of network deduplication process of core storage 200)<(charge amount per network transfer amount)*(in-chunk dirty size)+(charge amount per calculation amount)*(calculation amount of difference reflection process and network deduplication process in core storage 200) is satisfied, the network deduplication process of transmitting the finger print of the difference chunk to the core storage 200 may be performed, and when the above-mentioned formula is not satisfied, it may be determined to transmit the difference portion to the core storage 200. In this manner, it is possible to perform appropriate data transfer in consideration of the transfer charge amount and the processing charge amount, instead of focusing only on the reduction of the data amount at the time of transfer.

In addition, in the above embodiment, a portion or all of the processes performed by the CPU may be performed by the hardware circuit. In addition, the program in the above embodiment may be installed from the program source. The program source may be a program distribution server or storage media (for example, portable storage media).

What is claimed is:

1. A storage device comprising a processor, the storage device being connected to another storage device capable of deduplicating and managing a data of a predetermined data unit in units of a predetermined division data unit via a network, wherein, when the data of the predetermined data unit including a difference is transferred to the other storage device, the processor determines whether to transmit a difference portion to the other storage device or to transmit a finger print of a difference division data unit to the other storage device based on a size of the difference portion and a size of the finger print of the difference division data unit which is the predetermined division data unit including the difference portion, and wherein the processor transmits the difference portion or the finger print to the other storage device according to a determination result, wherein the processor changes a condition based on the size of the difference portion and the size of the finger print in the difference division data unit to determine whether to transmit the difference portion to the other storage device or to transmit the finger print of the difference division data unit to the other storage device according to an attribute of the predetermined data unit.

2. The storage device according to claim 1, wherein the predetermined division data unit is a variable-length chunk, wherein, in a case where the data of the predetermined data unit including the difference is transferred to the other storage device, when a stub area is included in a difference chunk which is the difference division data unit including the difference portion in the predetermined data unit including the difference, the processor transmits the difference portion to the other storage device.

3. The storage device according to claim 1, wherein, when the data of the predetermined data unit including the difference is transferred to the other storage device, the processor determines whether to transmit the difference portion to the other storage device or to transmit the finger print of the difference division data unit to the other storage device based on the size of the difference portion of the difference division data unit, the size of the finger print of the difference division data unit, and a prediction ratio indicating a possibility of duplication with a division data unit of the other storage device in the division data unit of the data unit.

4. The storage device according to claim 3, wherein the predetermined division data unit is a variable-length chunk, wherein the difference division data unit is a difference chunk, and wherein, in a case where the data of the predetermined data units including the difference is transferred to the other storage device, when a condition of (the size of the finger print of the difference chunk)+(the size of the difference portion of the chunk of the data unit)×(1−the prediction rate)<(the size of the difference portion of the chunk of the data unit) is satisfied, the processor determines that the finger print of the difference chunk is transmitted to the other storage device, and when the above condition is not satisfied, the processor determines that the difference portion is transmitted to the other storage device.

5. The storage device according to claim 3, wherein the predetermined division data unit is a fixed-length chunk, wherein the difference division data unit is a difference chunk, and wherein, in a case where the data of the predetermined data unit including the difference is transferred to the other storage device, and a stub area is included in the difference chunk including the difference portion in the data unit including the difference, when a condition of (the size of the finger print of the difference chunk)+(a size of the stub area in the difference chunk)+(the size of the difference portion of the chunk of the data unit)×(1−the prediction rate)<(the size of the difference portion of the chunk of the data unit) is satisfied, the processor determines that data of the stub area is acquired from the other storage device, and when the condition is not satisfied, the processor determines that the difference portion is transmitted to the other storage device.

6. The storage device according to claim 1, wherein, when the data of the predetermined data unit including the difference is transferred to the other storage device, the processor determines whether to transmit the difference portion to the other storage device or to transmit the finger print of the difference division data unit to the other storage device based on a first total amount as a sum of a charge amount in communication based on the size of the difference portion of the division data unit of the data unit and a charge amount for a process of determining duplication with the division data unit of the other storage device for the difference division data unit of the other storage device by using the difference portion of the division data unit and a second total amount as a sum of a charge amount in communication based on the size of the finger print of the difference division data unit and a charge amount for a process of determining duplication with the division data unit of the other storage device for the difference division data unit of the other storage device by using the finger print of the difference division data unit.

7. A storage device comprising a processor, the storage device being connected to another storage device capable of deduplicating and managing a data of a predetermined data unit in units of a predetermined division data unit via a network, wherein, when the data of the predetermined data unit including a difference is transferred to the other storage device, the processor determines whether to transmit a difference portion to the other storage device or to transmit a finger print of a difference division data unit to the other storage device based on a size of the difference portion and a size of the finger print of the difference division data unit which is the predetermined division data unit including the difference portion, and wherein the processor transmits the difference portion or the finger print to the other storage device according to a determination result, wherein the difference division data unit is a fixed-length chunk, wherein, in a case where the data of the predetermined data unit including the difference is transferred to the other storage device, when a stub area is included in a difference chunk which is the difference division data unit including the difference portion in the predetermined data unit including the difference, the processor determines whether to transmit the difference portion to the other storage device or whether to acquire data of the stub area from the other storage device based on the size of the difference portion of the difference chunk, a size of the stub area, and the size of the finger print of the difference chunk, and wherein, when it is determined that the data of the stub area is acquired from the other storage device, the processor transmits a transmission request for the data of the stub area to the other storage device, receives the data of the stub area from the other storage device, calculates the finger print of the difference chunk by using the received data of the stub area, and transmits the finger print of the difference chunk to the other storage device.

8. A computer system comprising:

a first storage device capable of deduplicating and managing a data of a predetermined data unit in units of a predetermined division data unit; and a second storage device connected to the first storage device via a network, wherein, when the predetermined data unit including a difference is stored in the first storage device, the second storage device determines whether to transmit a difference portion to the first storage device or whether to transmit a finger print of a difference division data unit to the first storage device based on a size of the difference portion and a size of the finger print in the difference division data unit which is a division data unit including the difference portion, and the second storage device transmits the difference portion or the finger print to the first storage device according to a determination result, wherein, when the difference portion is received from the second storage device, the first storage device calculates the finger print of the difference division data unit and performs a duplication determination between the difference division data unit and another division data unit stored in the first storage device based on the calculated finger print, wherein, when the finger print is received from the second storage device, the first storage device performs the duplication determination between the difference division data unit and the other division data unit stored in the first storage device based on the finger print, and wherein a result of the duplication determination is transmitted to the second storage device.

* * * * *